United States Patent
Joshi et al.

(10) Patent No.: US 11,359,961 B2
(45) Date of Patent: Jun. 14, 2022

(54) METHOD FOR CALIBRATING A PHOTODETECTOR

(71) Applicants: Österreichische Akademie der Wissenschaften, Vienna (AT); Ruder Bošković Institute, Zagreb (HR)

(72) Inventors: Siddarth Koduru Joshi, Vienna (AT); Rupert Ursin, Vienna (AT); Waris Ferdaus Ziarkash, Vienna (AT); Mario Stipčević, Zagreb (HR)

(73) Assignee: Ruder Boskovic Institute, Zagreb (HR)

( * ) Notice: Subject to any disclaimer, the term of this patent is extended or adjusted under 35 U.S.C. 154(b) by 0 days.

(21) Appl. No.: 16/958,413

(22) PCT Filed: Dec. 20, 2018

(86) PCT No.: PCT/EP2018/086159
§ 371 (c)(1),
(2) Date: Jun. 26, 2020

(87) PCT Pub. No.: WO2019/129634
PCT Pub. Date: Jul. 4, 2019

(65) Prior Publication Data
US 2021/0055156 A1    Feb. 25, 2021

(30) Foreign Application Priority Data
Dec. 27, 2017    (EP) .................................. 17210727

(51) Int. Cl.
*G01J 1/44* (2006.01)
*G01J 1/02* (2006.01)

(52) U.S. Cl.
CPC ............... *G01J 1/44* (2013.01); *G01J 1/0295* (2013.01); *G01J 2001/442* (2013.01); *G01J 2001/446* (2013.01)

(58) Field of Classification Search
CPC ............... G01J 1/44; G01J 2001/4413; G01J 2001/442; G01J 2001/4446;
(Continued)

(56) References Cited

U.S. PATENT DOCUMENTS

| | | | |
|---|---|---|---|
| 5,694,211 A * | 12/1997 | Ohsuka ..................... | G01J 1/42 250/368 |
| 2011/0127415 A1* | 6/2011 | Kanter ................... | G01D 18/00 250/252.1 |

(Continued)

OTHER PUBLICATIONS

Abdul Waris Ziarkash et al.: "Comparative study of afterpulsing behavior and models in single photon counting avalanche photo diode detectors", arXiv.org > physics > Instrumentation and Detectors > arXiv:1701.03783, Dec. 11, 2017 (Dec. 11, 2017), XP055480224.
(Continued)

*Primary Examiner* — John R Lee
(74) *Attorney, Agent, or Firm* — Hoffmann & Baron, LLP

(57) ABSTRACT

Method for calibrating a photodetector (3), the method including the following steps: measuring an afterpulsing probability and/or timing of the photodetector (3) under different operating conditions defined by values of one or more operating parameters, at least one of which is a single-photon property of an optical signal (2) incident on the photodetector (3) when measuring the afterpulsing probability, and recording the measured afterpulsing probability and/or timing in relation to the values of the one or more operating parameters; and photodetector calibrated using this method.

15 Claims, 2 Drawing Sheets

(58) Field of Classification Search
CPC ......... G01J 2001/446; G01J 2001/4466; G01J 1/0295; G01J 1/02; G01J 1/42
See application file for complete search history.

(56) References Cited

U.S. PATENT DOCUMENTS

| | | | |
|---|---|---|---|
| 2012/0016634 A1* | 1/2012 | Brodsky | G01J 1/08 |
| | | | 702/181 |
| 2012/0016635 A1* | 1/2012 | Brodsky | G01J 1/42 |
| | | | 702/181 |
| 2014/0217264 A1* | 8/2014 | Shepard | H01L 27/14643 |
| | | | 250/208.1 |
| 2016/0091617 A1* | 3/2016 | Bouzid | H04B 10/70 |
| | | | 250/371 |
| 2021/0055156 A1* | 2/2021 | Joshi | G01J 1/42 |

OTHER PUBLICATIONS

Hee Jung Lee et al.: "Wavelength-scanning calibration of detection efficiency of single photon detectors by direct comparison with a photodiode", Metrologia, Institute of Physics Publishing, Bristol, GB, vol. 53, No. 2, Apr. 1, 2016 (Apr. 1, 2016), pp. 908-917, XP020300087.

N.S. Nightingale: "A new silicon avalanche photodiode photon counting detector module for astronomy", Experimental Astronomy, vol. 1, No. 6, Jan. 1, 1990 (Jan. 1, 1990), pp. 407-422, XP055480149.

\* cited by examiner

METHOD FOR CALIBRATING A PHOTODETECTOR

This application claims priority based on an International Application filed under the Patent Cooperation Treaty, PCT/EP2018/086159, filed Dec. 20, 2018, which claims priority to EP 17210727.8, filed Dec. 27, 2017.

BACKGROUND OF THE INVENTION

The invention concerns a method for calibrating a photodetector and a correspondingly calibrated photodetector. More in detail the invention applies to a photon counting detector or a single-photodetector. In particular the method applies to an Avalanche Photo Diode operated in Geiger mode.

A photodetector receives an optical signal and emits an electric or electronic signal. The optical signal can be a single photon, a collection of photons, a stream of photons, a mode of photons, a beam of photons, a wave packet of photons, a photon bundle, a group of photons or a photon pulse. The electric signal can be a digital signal or an analogue signal or an electric pulse or an electronic/optical/radio/microwave frequency or a voltage or current level. Within the scope of the present invention, the photodetector can be part of an optical sensor, e.g. as used in a digital camera. The invention concerns any application, where weak optical signals need to be processed; specifically, it concerns low-light microscopy, time-resolved microscopy (e.g. as used in biomedical applications) and quantum communication applications (e.g. Quantum Key Distribution). The meaning of "photodetector" encompasses the detectors and sensors in all of the mentioned applications.

In an ideal photodetector, the electric signal is proportional to the optical signal; e.g. the amplitude or number of electric pulses is proportional to the number of photons incident on an active area of the detector. An ideal single-photon detector (i.e. a photodetector specifically designed for detecting single photons, e.g. an Avalanche Photo Diode operated in Geiger mode) emits one and only one electric pulse for every incident photon. In practice and on a non-ideal photodetector however, it is possible that a single incident photon results in more than one electric pulse. This is known as "after pulsing". In the present application, an "afterpulse" refers to an electric pulse that is generated by a photodetector in addition to and following a detection event triggered by an incident optical signal (e.g. a photon), regardless of the cause of the additional electric pulse. If not defined otherwise, the afterpulse probability refers to the probability distribution (e.g. density function or histogram) of an afterpulse event over the time elapsed since the previous detection event. The total afterpulse probability is defined as the sum total of the afterpulse probability within a predetermined fixed period, for example 900 ns (nanoseconds), following the detection event (i.e. in each bin of the corrected correlation-histogram for the predetermined duration of e.g. 900 ns). The predetermined fixed period may have any value between 0 ns and 10 000 ns. The beginning of the predetermined fixed period may be a predetermined value different from 0. For example, a particular convention for measuring the afterpulse probability is to account for all events between 100 ns and 500 ns after a detection event (hence, a predetermined fixed period of 400 ns starting 100 ns after the detection event). The invention presented here applies irrespective of the applicable convention for defining the afterpulse probability. Generally, afterpulses cause an overestimation of the optical signal, e.g. the number of photons.

Afterpulsing can cause significant overestimation of the count rates. This is a source of error for many measurements. The afterpulsing behaviour of the detector can change depending on the measurement being performed.

SUMMARY OF THE INVENTION

It is an object of the present invention to provide an improved estimate of the afterpulse probability.

The invention is based on the realization that it is not enough to calibrate the detector under just a single test condition. Instead the preferred calibration (as detailed here) is to calibrate the detector under a variety of test conditions to account for the variation of afterpulsing during different measurements. For example, the total afterpulse probability depends on the incident rate of photons on the detector. Measurements of different light levels will thus have completely different errors associated with each measurement. The solution according to the present invention is to calibrate the detector using the procedure described here. Once our calibration procedure has been carried out, the detector's readings can be corrected depending on its current operating parameters for each and every measurement/reading. This leads to a uniform and correct estimate of the errors in any application of the detector.

The invention proposes a method of the kind stated in the outset comprising the following steps:

measuring an afterpulsing probability and/or timing of the photodetector under different operating conditions defined by values of one or more operating parameters, and recording the measured afterpulsing probability and/or timing in relation to the values of the one or more operating parameters;

wherein at least one of the operating parameters is a single-photon property of an optical signal incident on the photodetector when measuring the afterpulsing probability.

The present method is a method for calibrating a photodetector. The term "calibrating" generally refers to a procedure for determining characteristic (i.e. device-specific) systematic or stochastic measurement errors of a detector. This is usually achieved by performing reference measurements to establish the necessary error parameters that allow to estimate and potentially correct for anticipated errors. The present method applies this general concept to errors introduced by the above-described afterpulsing effects of photodetectors. It includes measuring the afterpulsing probability and/or timing of the photodetector under at least two different operating conditions; i.e. the at least two operating conditions differ with respect to at least one operating parameter of the measurement. The term "single-photon property" refers to properties that are well-defined for an individual photon and, if taken alone, are measurable properties of an individual photon. This does not limit the measurement of the present invention to single photons. Instead it means that the single-photon property of the optical signal can be measured either as a property of individual photons or as a statistical property of a photon collection (within the meaning defined above: group, stream, mode, beam, wave packet, etc.). For properties of individual photons, the selection of properties used as operating parameters of the present method is naturally limited by the uncertainty principle; e.g. if wavelength and position shall be determined as operating parameters for the afterpulsing probability and/or timing, they will be determined as collective properties of the photon collection. The reference to "afterpulsing probability and/or timing" means that what is measured and recorded during the present method may be for example: the afterpulsing probability distribution over time (e.g. a density function or a histogram), the afterpulsing probability within a given time interval, a characteristic time parameter of the afterpulsing probability distribution (e.g. a decay parameter), etc.

The recorded relationship between an afterpulsing probability and/or timing and different values of one or more operating parameters can be used for statistically correcting measurements performed with a calibrated photodetector (see the method for correcting described below) or as a criterion for selecting photodetectors for certain applications or finally as a detector characteristic influencing the operating conditions under which the photodetector will be operated in production or use.

Preferably the present method comprises: changing the value of the one or more operating parameters between measurements of the afterpulsing probability and/or timing. In this way, a predefined range of values of the one or more operating parameters can be scanned for changes of the afterpulsing probability and/or timing. This allows to identify a (relative) sensitivity of the afterpulsing probability and/or timing to certain operating parameters; e.g. a subset of all operating parameters scanned in the above-mentioned manner.

According to a preferred embodiment of the present method, the single-photon property of the optical signal is a member selected from the group consisting of: the spatial mode, in particular the size, the shape, the position or the polarization, or the temporal mode, in particular the wavelength, of the optical signal. For example, the present method comprises measuring an afterpulsing probability and/or timing of the photodetector for two or more optical signals having different wavelengths and recording the measured afterpulsing probability and/or timing in relation to the respective wavelength. In this example, the information recorded during calibration allows to estimate the expected afterpulsing behaviour during use of the photodetector, taking into account a known wavelength of the optical signal incident on the photodetector. It turns out, that the resulting estimate is generally more accurate than an overall afterpulsing probability defined for all operating conditions; hence, it allows for more accurate compensation of the overestimated optical signal resulting from afterpulsing effects.

Moreover, it has turned out advantageous, that at least one of the operating parameters is a continuous property of a stream of photons incident on the photodetector when measuring the afterpulsing probability. In this context the term "stream" refers to a collection of multiple photons incident on the photodetector at different times. As per this definition, the stream of photons may be also referred to as or includes the meanings of e.g. "beam", "mode", "packet" or "bundle" of photons. By measuring and recording the afterpulsing probability and/or timing at different values of such a continuous property, a dependence and relative sensitivity with respect to the property can be identified, estimated and finally compensated during use of the calibrated photodetector.

In this respect, the continuous property is preferably a member selected from a group consisting of: the intensity, the average power, the peak power, the number of photons per unit time or by measurement time bin, the frequency or rate of photons, the time duration between photons, and for a pulsed photon stream: the power per pulse, the mean photon number per pulse or the pulse duration.

At least one of the operating parameters can preferably be a beam property of a light beam incident on the photodetector when measuring the afterpulsing probability and/or timing. In this context, the term "beam" refers to a geometrically confined stream of photons. In particular, the beam property may be a member selected from a group consisting of: the position on the photodetector, the angle of incidence on the photodetector, the size on the active area of the photodetector, or the optical mode (or transverse mode) on the photodetector. By measuring and recording the afterpulsing probability and/or timing at different values of such a beam property, a dependence and relative sensitivity with respect to the beam property can be identified, estimated and finally compensated during use of the calibrated photodetector.

Furthermore, at least one of the operating parameters can preferably be a detector property of the photodetector. A detector property is a property of the photodetector, i.e. that can be determined by a measurement of the state of the photodetector. Detector properties include properties that are influenced by the operation of the detector. In particular, the detector property may be a member selected from a group consisting of: the temperature of the photodetector, the age of the photodetector (e.g. the time elapsed since the detector was produced or the total operation time of the photodetector), or the time since the photodetector was turned on. Within the scope of the present method, the temperature of the photodetector can be determined by direct measurement of the operating temperature of the active area of the photodetector or by measurement of related temperatures or temperatures of connected elements, such as the overall average operating temperature within a photodetector housing, the operating temperature of a quenching circuit connected to the photodetector, or the operating temperature of a diode housing of the photodetector.

In particular, the operating parameters defining the different operating conditions, under which an afterpulsing probability and/or timing of the photodetector is measured and in relation to which it is recorded according to the inventive method, may comprise any combination of at least two of the operating parameters mentioned above, preferably any combination of at least three of the operating parameters mentioned above, more preferably any combination of at least four of the operating parameters mentioned above, or even more preferably any combination of at least five of the operating parameters mentioned above.

In particular, the operating parameters defining the different operating conditions, under which an afterpulsing probability and/or timing of the photodetector is measured and in relation to which it is recorded according to the inventive method, may comprise any combination of at least two of the operating parameters mentioned above.

Preferably the operating parameters defining the different operating conditions, under which an afterpulsing probability and/or timing of the photodetector is measured and in relation to which it is recorded according to the inventive method, may comprise any combination of at least three of the operating parameters mentioned above.

More preferably the operating parameters defining the different operating conditions, under which an afterpulsing probability and/or timing of the photodetector is measured and in relation to which it is recorded according to the inventive method, may comprise any combination of at least four of the operating parameters mentioned above.

Even more preferably the operating parameters defining the different operating conditions, under which an afterpulsing probability and/or timing of the photodetector is measured and in relation to which it is recorded according to the inventive method, may comprise any combination of at least five of the operating parameters mentioned above.

According to a particularly preferred embodiment of the invention, a pulsed photon stream is used for measuring the afterpulsing probability, wherein the operating parameters include at least the mean number of photons per pulse, the time between pulses, the position of an optical signal on the active area of the photodetector, and the polarization of the photons incident on the photodetector. It has turned out, that for common photodetector types the afterpulsing probability is sensitive to at least one, usually all, of the four operating parameters identified above. Therefore, a calibration under different operating conditions defined by different values of those four operating parameters allows for a particularly accurate estimate of the afterpulsing probability. Ignoring all other operating parameters, to which the afterpulsing probability and/or timing is relatively insensitive, streamlines the process of calibration.

In order to identify a specific sensitivity of a given photodetector to influences on the afterpulsing probability, the present method may comprise the step of: determining from the recorded relations at least one member selected from a group consisting of: a change in total probability of afterpulses, a change to the distribution of afterpulses in time, a change to statistical properties of the afterpulses (e.g. the average number of afterpulses or the average delay of afterpulses), a change to the individual afterpulse either electronically (height or strength of the electric afterpulse signal) or temporally (duration of the electric afterpulse signal). The changes mentioned above are evaluated with respect to changes to the values of one operating parameter in order to identify sensitivity to that specific operating parameter. Based on the relative change, a step-width used for scanning a parameter range can be adapted or a parameter can be skipped altogether in case no specific sensitivity can be found.

The afterpulsing probability and/or timing may preferably be measured by cross correlation of signals measured with the photodetector with signals from a trigger of a light source, in particular a single-photon source.

Correspondingly and to the same advantages, the present invention solves the problem mentioned in the outset with a photodetector calibrated using the method describe above.

Within the scope and application of the present invention to solve the problem mentioned in the outset, it includes a method for correcting a measurement of a photodetector calibrated using the method for calibrating described above, the method for correcting comprising:
 determining the value of one or more operating parameters related to the recorded afterpulsing probability and/or timing;
 estimating a relative signal component, which is due to afterpulsing, from the recorded afterpulsing probability and/or timing and from the determined parameter values; and
 compensating an electric signal measured with the photodetector with the estimated relative signal component.

Finally, the problem mentioned in the outset is solved by a system configured to correct for afterpulsing effects of a photodetector based on recorded relations between an afterpulsing probability and/or timing and the values of one or more operating parameters, wherein at least one of the operating parameters is a single-photon property of an optical signal incident on the photodetector. The system may operate optically or electronically. According to a preferred embodiment, the system can be a programmed digital circuit accessing a data storage holding the recorded relations. The correction for afterpulsing effects will generally be a statistical correction, i.e. applying to a collection of measurements performed under similar operating conditions.

BRIEF DESCRIPTION OF THE DRAWINGS

Referring now to the drawings, wherein the figures are for purposes of illustrating the present invention and not for purposes of limiting the same, FIG. 1 schematically an autocorrelation setup for measuring an afterpulsing probability.

DETAILED DESCRIPTION OF THE PREFERRED EMBODIMENTS

Figure 1:
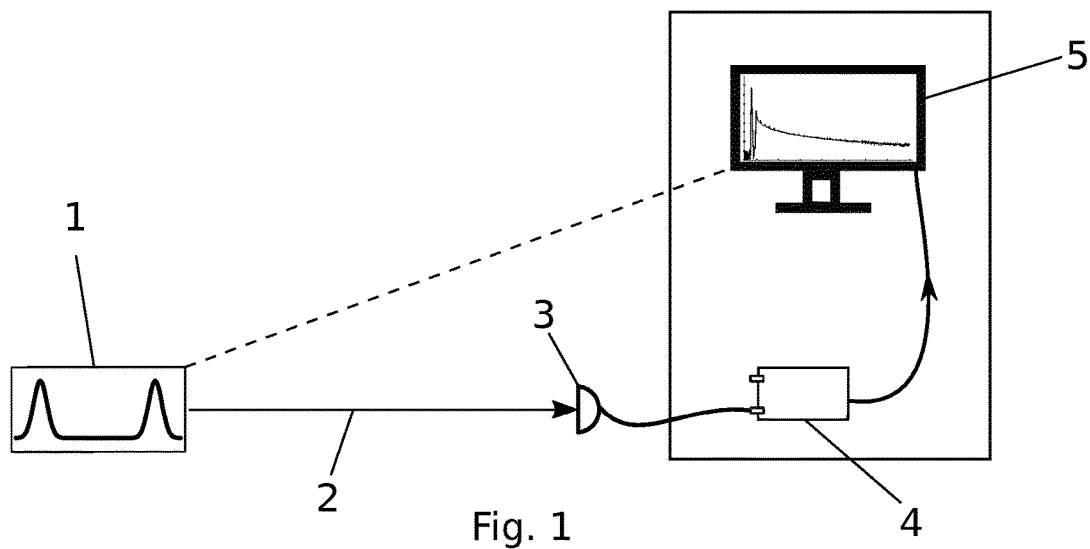
Figure 2:
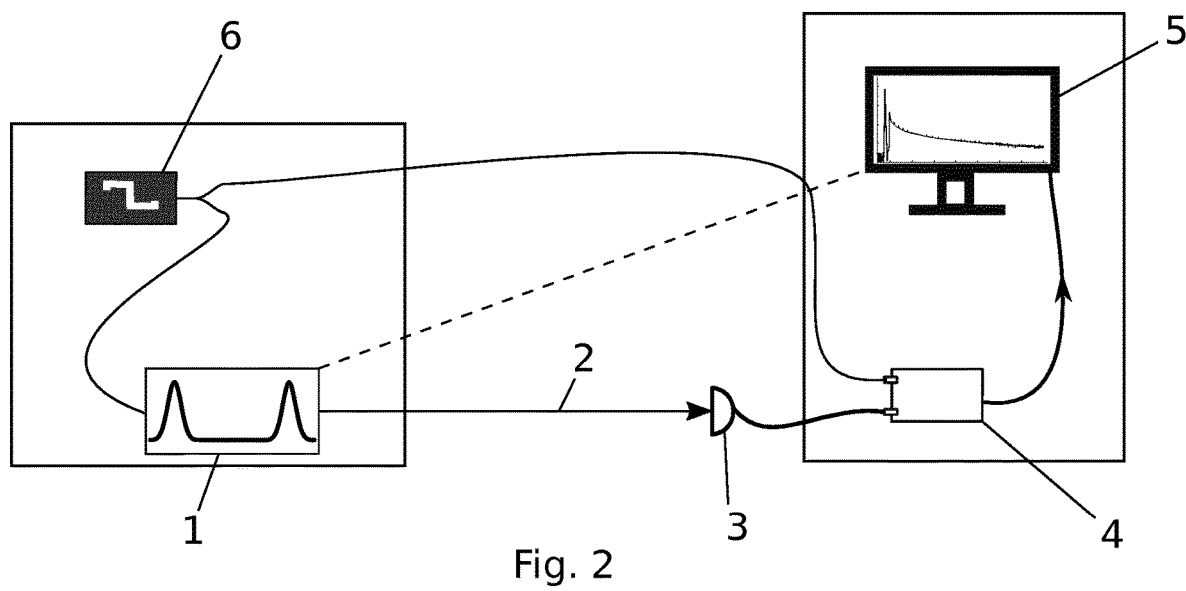
FIG. 2 schematically a crosscorrelation setup for measuring an afterpulsing probability.

In FIG. 1 and FIG. 2 a light source 1 generates an optical signal 2 in the form of single photons that are incident on a photodetector 3. The photodetector 3 is connected to a readout electronics 4 that receives an electric signal generated by the photodetector 3 in response to the incident optical signal 2 and identifies whether the electric signal corresponds to a detection event or to an afterpulse event. When an afterpulse event is detected, the readout electronics 4 transmits a digital time signal comprising the time distance between the afterpulse event and the previous detection event to a computer workstation 5 that records the received digital time signals. At the same time the computer workstation 5 and the light source 1 are connected via a data connection. The light source 1 transmits the current settings of the shape, wavelength and polarisation of the generated optical signal 2 to the computer workstation 5. The computer workstation 5 stores the received settings of the light source 1 in association with the recorded digital time signals.

In the autocorrelation setup shown in FIG. 1, the readout electronics 4 evaluate the time distance between subsequent electric signals received from the photodetector 3. If the time distance is below a certain threshold depending on the rate of single photons generated by the light source 1 (for example 1 millisecond), the latter electric signal is recognised as an afterpulse and reported to the computer workstation 5.

In the crosscorrelation setup shown in FIG. 2, the readout electronics 4 and the light source 1 are both connected to a trigger generator 6. The trigger generator 6 generates a trigger signal and transmits it to the light source 1 and to the readout electronics 4. In response to the trigger signal, the light source 1 generates a single-photon as the optical signal 2 sent to the photodetector 3. At the same time (with a suitable delay compensation), the readout electronics 4 starts an internal timer that measures the time between the reception of the trigger signal and any subsequent electric signals generated by the photodetector 3. It assumes that the first electric signal after the trigger signal marks a detection event and all subsequent signals before the next trigger signal are afterpulse events that are correspondingly reported to the computer workstation 5 as described above.

By controlling the light source 1 to change the settings of the shape, wavelength and polarisation of the generated optical signal 2, the computer workstation 5 will collect data on the afterpulsing probability under different operating conditions characterised by those operating parameters. From the collected data, the sensitivity of the photodetector 3 to certain operating parameters can be determined and modelled, thereby allowing for accurate correction of subsequent measurements using the photodetector 3.

Figure 3:
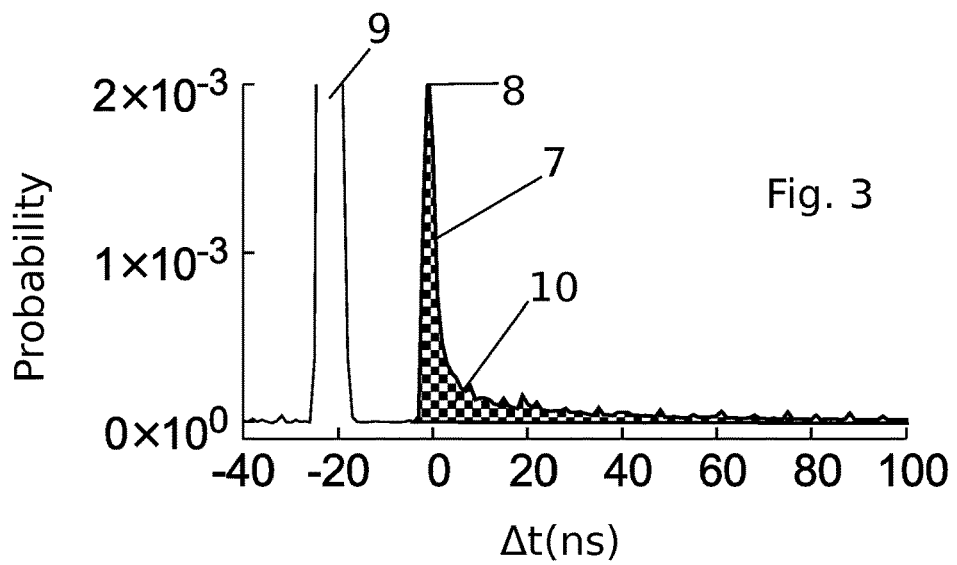
FIG. 3 a function diagram showing a typical afterpulsing probability density function over time.

FIG. 3 shows a measured probability 7 of signals detected by a photodetector over time. The time coordinates are relative to the position of an afterpulse peak 8. The cut-off detection peak 9 about 20 nanoseconds (ns) prior to the afterpulse peak 8 represents the detection event. The area 10 of the squared pattern underneath the afterpulse peak 8 and its tail represents the total afterpulse probability. The measured probability 7 is normalized to total one.

Figure 4:
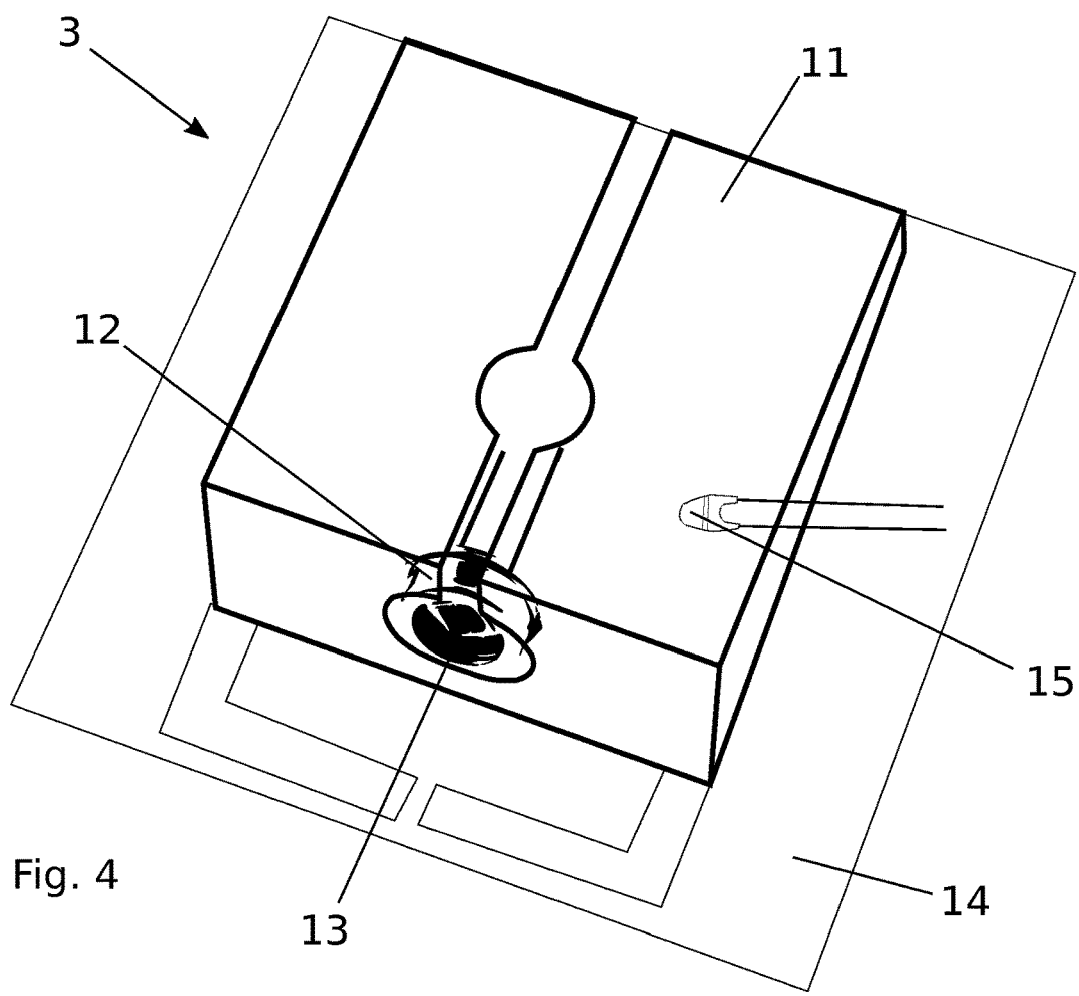
FIG. 4 a schematical pictorial drawing of a photodetector in a measurement setup for carrying out the present invention.

FIG. 4 shows a more detailed view of the photodetector 3 and its surroundings during a calibration according to the present invention. The photodetector 3 comprises a housing 11 and a diode 12. The diode 12 is snugly fit into a corresponding recess in the housing 11. The diode 12 comprises an active area 13, which is the photosensitive part of the photodetector 3. The housing 11 is made of metal and serves as a heat dissipating element. In particular it provides a thermal connection between the diode 12 and a Peltier element 14. The Peltier element 14 is used for controlling the temperature of the diode 12. A temperature sensor 15 is thermally connected to the housing 11. It provides measurements of the temperature of the housing 11. The photodetector 3 can be calibrated according to the present method by determining the afterpulsing probability from the output of the diode 12 in relation to the temperature provided by the temperature sensor 15. By controlling the Peltier element 14 to change the temperature of the housing 11 and consequently the diode 12 to different values, a characteristic curve of the afterpulsing probability at different operating temperatures can be determined.

The invention claimed is:

1. A method for calibrating a photodetector, the method comprising the following steps:
    measuring an afterpulsing probability of the photodetector under different operating conditions defined by values of one or more operating parameters, and
    recording the measured afterpulsing probability in relation to the values of the one or more operating parameters;
    wherein at least one of the operating parameters is a single-photon property of an optical signal incident on the photodetector during the measuring of the afterpulsing probability.

2. The method according to claim 1, further comprising: changing the value of the one or more operating parameters between measurements of the afterpulsing probability.

3. The method according to claim 1, wherein the single-photon property of the optical signal is a member selected from a group consisting of: the spatial mode, or the temporal mode.

4. The method according to claim 1, wherein at least one of the operating parameters is a continuous property of a stream of photons incident on the photodetector during the measuring of the afterpulsing probability.

5. The method according to claim 4, wherein the continuous property is a member selected from a group consisting of: the intensity, the average power, the peak power, the number of photons per unit time or by measurement time bin, the frequency or rate of photons, the time duration between photons, and for a pulsed photon stream:
    the power per pulse, the mean photon number per pulse or the duration of a pulse.

6. The method according to claim 1, wherein at least one of the operating parameters is a beam property of a light beam incident on the photodetector during the measuring of the afterpulsing probability.

7. The method according to claim 6, wherein the beam property is a member selected from a group consisting of: the position on the photodetector, the angle of incidence on the photodetector, the size on the active area of the photodetector, or the optical mode on the photodetector.

8. The method according to claim 1, wherein at least one of the operating parameters is a detector property of the photodetector.

9. The method according to claim 8, wherein the detector property is a member selected from a group consisting of: the temperature of the photodetector, the age of the photodetector, the time since the photodetector was turned on.

10. The method according to claim 1, wherein a pulsed photon stream is used for measuring the afterpulsing probability, and wherein the operating parameters include at least the mean number of photons per pulse, the time between pulses, the position of the optical signal on the active area of the photodetector, and the polarization of the photons incident on the photodetector.

11. The method according to claim 1, further comprising determining from the recorded relations at least one member selected from a group consisting of: a change in total probability of afterpulses, a change to the distribution of afterpulses in time, a change to statistical properties of the afterpulses, a change to the individual afterpulse either electronically or temporally.

12. The method according to claim 1, wherein the afterpulsing probability is measured by cross correlation of signals measured with the photodetector with signals from a trigger of a light source.

13. A photodetector calibrated using the method according to claim 1.

14. A method for correcting a measurement of a photodetector calibrated using the method according to claim 1, the method comprising:
    determining the value of one or more operating parameters related to the recorded afterpulsing probability;
    estimating a relative signal component, which is due to afterpulsing, from the recorded afterpulsing probability and from the determined parameter values; and
    compensating an electric signal measured with the photodetector with the estimated relative signal component.

15. A system configured to correct for afterpulsing effects of a photodetector based on recorded relations between an afterpulsing probability and the values of one or more operating parameters, the system being configured to perform the following steps:
    measure the afterpulsing probability of the photodetector under different operating conditions defined by values of one or more operating parameters, and record the measured afterpulsing probability in relation to the values of the one or more operating parameters, wherein at least one of the operating parameters is a single-photon property of an optical signal incident on the photodetector.

* * * * *